March 1, 1938. C. J. COPLAND 2,109,585
CRYSTALLIZATION OF DEXTROSE
Filed Dec. 14, 1936
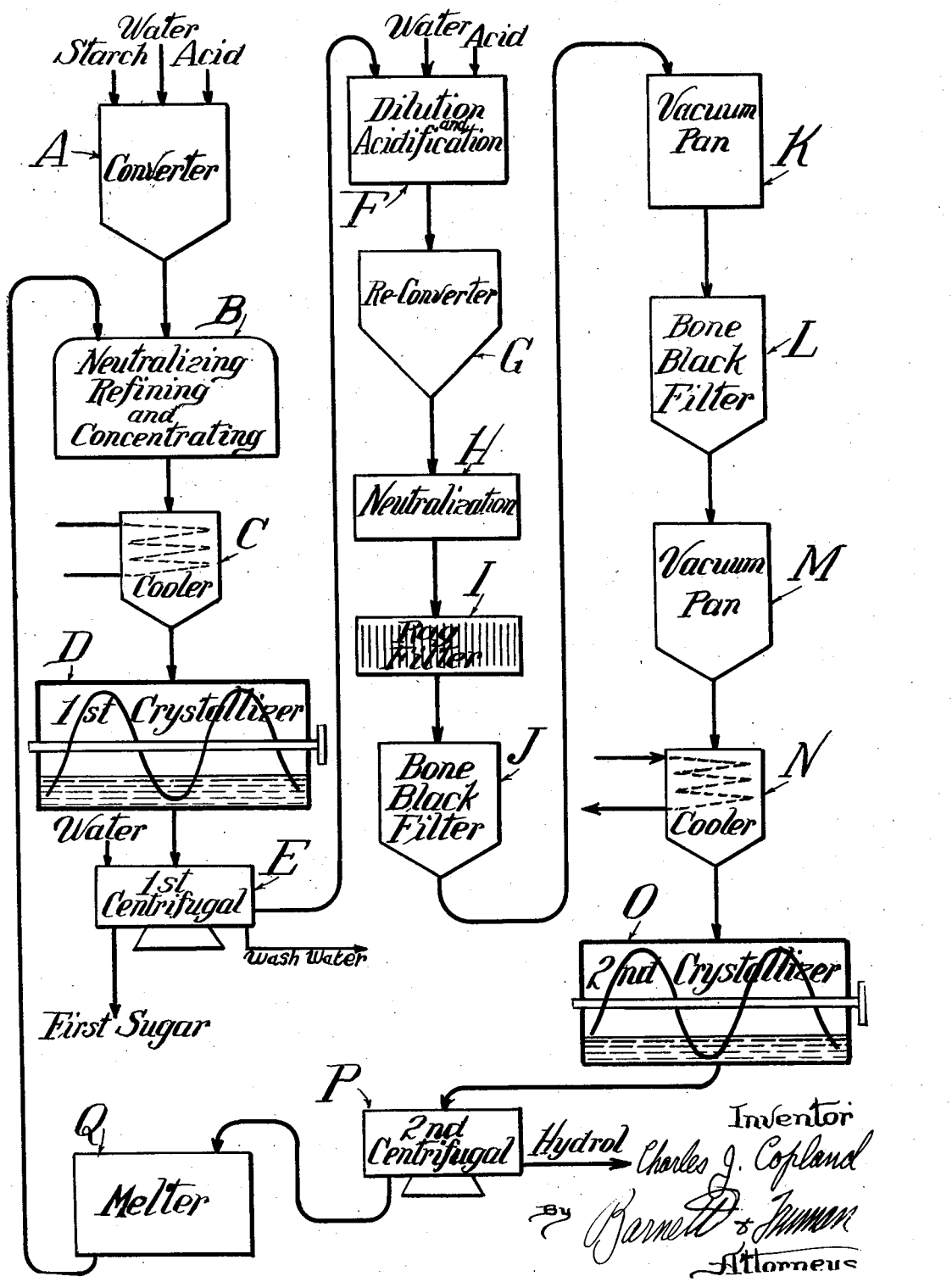
Inventor
Charles J. Copland
By Barnett & Jarmon
Attorneys Patented Mar. 1, 1938

2,109,585

UNITED STATES PATENT OFFICE 2,109,585

CRYSTALLIZATION OF DEXTROSE

Charles J. Copland, North Kansas City, Mo., assignor to International Patents Development Company, Wilmington, Del., a corporation of Delaware Application December 14, 1936, Serial No. 115,800

5 Claims. (Cl. 127—40)

This invention relates to the production of crystalline dextrose, particularly dextrose hydrate, by the method of crystallization in motion followed by the purging of the massecuite, for example by centrifuging, to remove the mother liquor.

The object of the invention is to provide certain improvements upon the processes disclosed in United States Patent No. 1,471,347 to W. B. Newkirk, October 23, 1923, and Patent No. 1,521,830 to the same, January 6, 1925, whereby the output of high purity dextrose from a given crystallizer equipment during a given period may be very materially increased and the cost, therefore, of the crystallizing operation proportionately reduced; and whereby the yield of high purity dextrose from a given quantity of starch is also materially increased.

The patents just mentioned contemplate the possibility of three successive crystallizations of the starch converted dextrose solution with two yields of high purity sugar and a third yield of sugar of lower purity. With the technical improvement which has resulted from several years practice of the process, the yield of high purity sugar from the first crystallizing operation has been so much increased that the second crystallizing operation will not yield, except perhaps with excessive washing and consequent high sugar losses, a high purity sugar, that is a sugar between 99.5% and 100% purity; and the mother liquor from the second crystallization is so far spent of its dextrose content that a third crystallization is not regarded as commercially desirable and has been generally abandoned.

That is, with the improved technique the process is carried on so that there is a first crystallization yielding dextrose, when washed, of a purity very close to 100% and a mother liquor (first greens) having an apparent purity, (reducing sugar calculated as dextrose) of about 78%, followed by a second crystallization, that is, a crystallization of the first greens, yielding a sugar without washing of about 95% apparent purity, and a mother liquor (second greens) of such low dextrose content that it is usually disposed of as a by-product without further treatment.

Because of the relatively low purity of the first greens (although the liquor still contains a large quantity of crystallizable sugar) the crystallizing operation is very protracted. It may require eighteen days in comparison with five to seven days required for the first crystallizing operation. This long period of time consumed by the second crystallization entails a very considerable expense: a large number of crystallizers must be provided to accommodate the greens from the first crystallizers; the second crystallizers occupy a disproportionate amount of floor space in the factory and require a disproportionate amount of attention on the part of the operators; the power required for driving their agitators is also an item of expense.

As a result of the present invention the time required for the second crystallizing operation has been reduced nearly one-half. Consequently, in order to take care of the same quantities of first greens only about half the number of second crystallizers are now required. Moreover the actual amount of dextrose recovered from a given quantity of dry substance in the converter liquor, that is produced from a given quantity of starch, is considerably increased.

This effect is obtained by subjecting the first greens to a reconverting operation, preferably a mild reconversion of such character that while the dextrose content of the liquor is substantially increased, the percentage of reducing sugars is increased very little, if at all. The first greens contain, in addition to the water, dextrose which is a monosaccharide, gentiobiose which is a disaccharide, both of these sugars being reducing sugars, reducing Fehling's solution but not in the same ratio, and also certain non-reducing sugars of higher molecular weight than the gentiobiose, probably trisaccharides; these sugars, reducing and non-reducing, making up the solid content of the liquor, except for small quantities of ash and possibly other impurities. There may be in the liquor other reducing sugars of the gentiobiose type than gentiobiose, but the matter is unimportant since, if they exist, their reducing power on the average is the same as the reducing power of gentiobiose. The non-dextrose reducing sugars will therefore be referred to, without further qualification, as gentiobiose.

In carrying out the process according to the present invention, in its preferred form, the reconversion is of such mild character that while the dextrose content may be raised 10% to 12%, for example, the reducing sugar content of the liquor is perhaps increased 1% or 2%, or not at all. What apparently takes place in the converter is the reconversion of the gentiobiose into dextrose, which latter, of course, is crystallizable while gentiobiose is not, without any substantial splitting or conversion of the polysaccharide non-reducing sugars into the disaccharide gentiobiose. This accounts for the increase in dextrose when there is little or no change in the total reducing sugar content.

The mild conversion is advantageous because it minimizes destruction of sugar substance, and gives cleaner solutions and therefore a purer and whiter sugar.

After the first greens have been reconverted in the manner described, the reconverted liquor is neutralized, filtered, given an adsorption treatment and concentrated and then subjected to the second crystallizing operation following, generally speaking, the procedure of Patent No. 1,521,830. The crystallizers used for dextrose crystallization are ordinarily large, horizontally placed, cylindrical vessels which may contain upwards of 100,000 pounds of massecuite and are provided with water jackets through which cold water is circulated in order to aid natural radiation in carrying off the heat developed by the crystallizing operation, which is exothermic, and bring about gradually a reduction of the temperature of the mass so as to maintain supersaturation as the operation proceeds. It has been customary to start the circulation of water through the jackets of second crystallizers about seventy-two hours after the crystallizers have been loaded. According to the process of the present invention the water can be put on within twelve hours of the beginning of the crystallizing operation and kept in circulation until the end of the operation. This means that the temperature is forced down much more rapidly which is possible because of the higher purity of the liquor treated.

United States Patent to Ebert, Newkirk and Moskowitz, No. 1,673,187, June 12, 1928, discloses a method of treating "hydrol", that is, mother liquor from second or third crystallizing operations, to increase the dextrose content of the liquor. The liquor is a solution which has been so depleted of its dextrose that substantially no more can be extracted by concentration and supersaturation. The solution is practically a spent solution. The process of the patent involves first a neutralization of the hydrol to pH=7; second, the precipitation of salts and the filtering of the neutralized liquor to remove such precipitates; and third, the acidification and conversion of the liquor, the latter preferably in a glass lined converter and in the presence of adsorption agents. The operation results in a very considerable increase in reducing sugars calculated as dextrose (apparent purity) which means that there is substantial conversion of non-reducing sugars into reducing sugars. The patent states that a hydrol having an apparent purity of 65% to 75% (reducing sugars calculated as dextrose) may be raised in purity to 86%–91% if reconversion is in copper, and to 96% if the reconversion is in glass. A somewhat similar process is disclosed in British patent to Marks, 290,847, June 15, 1927, which also describes the process as applied to dextrose solutions derived immediately from the starch converting operation.

United States Patent No. 1,704,037, March 5, 1929, to Ebert, Newkirk and Moskowitz, provides an improvement upon Patent No. 1,673,187. The neutralization and precipitation of impurities from the hydrol is omitted and also the expensive step of reconversion in glass. The hydrol is given a very strong conversion by use of a relatively large quantity of acid and this results in an increase of apparent purity from 70% to 90%. The reconverted liquor is crystallized and the sugar has, after washing, a purity of 95%, but has a light yellow color.

The processes of these patents might be used to some advantage at least, for treatment of first greens in accordance with the method of the present invention. But it is very much better to employ the mild conversion, to be hereinafter described. The use of a large quantity of acids brings about a considerable destruction of sugar substance. The results in the formation of humic acids which make the solutions dark, somewhat dirty and difficult and expensive to refine and decolor. The impurities formed interfere with and impede the freedom of crystallization and give the crystallized sugar a yellowish color unless a large amount of water is used for washing the centrifuged massecuite and this results in large sugar losses and impairs the brilliancy of the crystals. The steps of neutralization and filtering, preceding conversion, add to the expense of the process as does also the conversion in glass. The neutralization, especially if carried to the neutral point and the use of a large amount of acid, which are specified in the first mentioned two patents, if applied to the treatment of first greens before re-crystallization would give the solution an undesirably high salt content. Furthermore, it has been discovered that it is possible to re-convert first greens at densities up to 20° Baumé (entering density, as is usually considered in converting operations) while with hydrols, that is second or third mother liquors, it is necessary in order to obtain a profitable yield to dilute the hydrol down to about 10° Baumé. The conversion takes place at the higher densities, in the case of hydrol, but in such reduced amount that the operation is not economically advantageous. It is preferable, therefore, in the treatment of first greens to omit the neutralization and removal of impurities precedent to the re-crystallizing operation and to use a much reduced amount of acid than is specified in the patents referred to.

This is particularly desirable in a process involving the melting of the second sugar and the incorporation of the melted sugar with the converter liquor going to the first crystallizer since the freer the first greens are of salts and other impurities, the purer will be the second sugar to be returned to the process.

The invention in this preferred form is illustrated in the accompanying flow sheet diagram.

The first stage of the process, that is, the conversion of the starch, the refining of the liquor, and its crystallization, need not be described in detail as this much of the process follows the principles of United States Patent No. 1,521,830.

Referring to the flow sheet, the starch, water and acid are introduced into the converter A and the converted liquor neutralized to the usual point which is considerably below neutrality, refined and concentrated as indicated at B. The concentrated liquor is cooled at C and introduced into the first crystallizer D on a body of "foots", that is, on a part of the massecuite left in the crystallizer, for this purpose, from the last crystallizing operation.

When the crystallizing operation is completed a major portion of the massecuite is drawn from the first crystallizer D into the centrifugal machines E where the mother liquor (first greens) is spun out and the sugar washed with fresh water and discharged as merchantable first sugar with a purity of 99.5% or higher.

The first greens may have a pH of 4.8, a reducing sugar content (dextrose plus gentiobiose) of 88.5%, a dextrose content of 67.2% and an apparent purity (reducing sugars calculated as dextrose) of 78%. The gentiobiose content is, therefore, 21.3%.

This liquor is diluted to a density of between 14° and 20° Baumé, preferably to 17° Baumé, with enough water to make up a batch of 2500 gallons. The dilution tank is indicated at F on the flow sheet. The liquor is acidified with not to exceed 100 pounds of 28% hydrochloric acid, or an equivalent amount of other acid, and run into the re-converter G where it is subjected to 50 pounds steam pressure for 20 to 30 minutes, preferably 24 minutes, after the pressure has been built up to the maximum. The acid used may be as low as 75 pounds 28% HCl.

The reconverted liquor will have, according to the preferred data as given above, a dextrose content of 79.6%, 12.4% higher than the dextrose content of the first greens, but a content of reducing sugars (dextrose plus gentiobiose) of 89.1%, only 0.6% higher than the reducing sugar content of the first greens. This shows that a large proportion of the 21% of gentiobiose has been converted into dextrose without, however, any substantial quantity of the non-reducing sugars being converted to reducing sugar; and it indicates the desired mildness of conversion, because, when the reconversion is so carried out, the coloration difficulties and other objections to the processes of Patents Nos. 1,673,187 and 1,704,037 are to a very large extent eliminated. The apparent purity of the reconverted liquor (reducing sugars calculated as dextrose) is 84%, an increase of only 6% over the apparent purity of the first greens; and this is another indication of the mildness of the reconverting operation.

The reconverted liquor is neutralized in the vessel H to preferably pH 5.1, is then passed through the rag filter I, and the bone char filter J, is concentrated at K to about 31° Baumé, passed through the second bone char filter L, and concentrated in the vacuum pan N to a density of from 38° to 41° Baumé, preferably 41° Baumé.

6650 gallons of the thus refined and concentrated liquor are cooled in the cooler N, and then run into crystallizer O on 2500 gallons of foots containing 58% solid phase. The liquor is cooled in cooler N to a temperature so as to give an initial temperature in the crystallizer O, when mixed with the foots, of about 100° F. Cold water is circulated through the water jacket of the crystallizer O beginning 12 hours after the crystallizer is loaded. The crystallizing time will be ordinarily between 7 and 10 days, instead of about 18 days according to previous practice. The final temperature in the crystallizer is about 69° F.

The massecuite discharged from the second crystallizer O is run into centrifugals P where the mother liquor (second greens or hydrol) is spun out. The sugar may be washed and marketed as a low grade sugar; or, as is preferable, it may be melted up in the melter Q and mixed with converter liquor, at the refining stage B. Unwashed, the sugar has an apparent purity of about 95%. The yield will be in the neighborhood of 66%–69% at 94%–95% apparent purity, based on dry substance in the greens.

The invention is based primarily on the conception that a dextrose solution from which a certain amount of dextrose has been extracted by crystallization, but which contains crystallizable sugar that can be extracted by a concentration of the liquor, viz. first greens, may by a simple re-conversion operation which can be carried out in the ordinary copper converter or autoclave and at a density to make the operation advantageous, have its dextrose content increased to such an extent, and without destructive effect on sugar substance or the production of color giving impurities, that the time required for crystallization can be very materially reduced and the yield of sugar increased. While it was known that the apparent purity of fully spent solutions, such as mother liquors from second or third crystallizations, could be raised by reconversion so that another yield of crystals could be obtained from liquors which were incapable without such treatment of yielding crystallizable sugar, the conception that a dextrose solution such as first greens containing dextrose ready to crystallize out could be advantageously reconverted by ordinary converting methods was contrary to the teaching of the art. The known detrimental effects of heat and acid on dextrose would seem to have indicated the inadvisability of reconverting dextrose solutions particularly in the usual copper converters until all or substantially all of the dextrose which could be extracted by a repeated crystallization, or repeated crystallizations, should have been extracted in that manner. Nevertheless, extended experience with the present invention has proven that an improvement, important as it is surprising, has resulted from the treatment of the mother liquor at the indicated stage of the process, with the liquor still containing a substantial amount of dextrose extractable, merely by concentration and recrystallization, namely, the shortening of the second crystallization period by substantially one-half, and the increased yield of sugar from a given amount of converter liquor so that with a given equipment of crystallizers, used for first and second crystallizations, the output of high purity dextrose, first sugar, may be increased over fifty percent.

It will be understood that the operating data given above are purely illustrative and informative. Instead of filtering through bone char, the liquors could be treated with activated vegetable carbons. Instead of using foots in the crystallizing operations, other means of seeding might be employed. Other modifications will suggest themselves to those skilled in the art.

The intention is to cover all equivalents and all modifications within the scope of the appended claims.

I claim:

1. Process of making crystalline dextrose hydrate which comprises: converting starch; subjecting the converted liquor to a slow motion crystallizing operation; purging the massecuite of its first greens mother liquor; subjecting the first greens containing crystallizable dextrose, acidified and diluted with water, to a reconverting operation with an acid of such concentration that the dextrose content of the liquor is increased and the reducing polysaccharides are decreased; neutralizing and concentrating the reconverted liquor; subjecting the reconverted liquor to a slow motion crystallizing operation; and purging the massecuite of its mother liquor whereby the yield of crystalline dextrose is increased.

2. Process of making crystalline dextrose hydrate which comprises: converting starch; subjecting the converted liquor to a slow motion crystallizing operation; purging the massecuite of its first greens mother liquor; subjecting the first greens, acidified and diluted with water, to a mild converting operation with a quantity of acid which increases, substantially, the dextrose content of the liquor without substantial increase of its total reducing sugars; neutralizing and concentrating the reconverted liquor; subjecting the reconverted liquor to a slow motion crystallizing operation; and purging the massecuite of its mother liquor.

3. Process of making crystalline dextrose hydrate which comprises: converting starch; subjecting the converted liquor to a slow motion crystallizing operation; purging the massecuite of its first greens mother liquor; diluting the first greens to a density of 14°–20° Baumé; acidifying the liquor to the extent represented by the addition of 75 to 100 pounds 28% HCl to 2500 gallons of liquor; converting the diluted and acidified liquor under approximately 50 pounds pressure for a period of 20 to 30 minutes; neutralizing, refining and concentrating the reconverted liquor to a density of 38° to 41° Baumé; subjecting the concentrated liquor to a slow motion crystallizing operation; and purging the massecuite of its mother liquor.

4. Process of making crystalline dextrose hydrate which comprises: converting starch; subjecting the converted liquor to a slow motion crystallizing operation; purging the massecuite of its first greens mother liquor; diluting the first greens to about 17° Baumé; acidifying the liquor to the extent indicated by the addition of 100 pounds 28% hydrochloric acid to 2500 gallons of the liquor; converting the liquor at approximately 50 pounds pressure for 24 minutes; neutralizing, refining and concentrating the reconverted liquor; crystallizing the liquor mixed with 58% solid phase foots in the proportion of 6650 gallons of liquor to 2700 gallons of foots by slow motion crystallization; and centrifuging the massecuite to extract the mother liquor.

5. Process of making crystalline dextrose hydrate which comprises: converting the starch; subjecting the converted liquor to a slow motion crystallizing operation; purging the massecuite of its first greens mother liquor; diluting the first greens to a density of 14°–20° Baumé; acidifying the liquor to the extent represented by the addition of 75 to 100 pounds 28% HCl to 2500 gallons of liquor; converting the diluted and acidified liquor under approximately 50 pounds pressure for a period of 20 to 30 minutes; neutralizing, refining and concentrating the reconverted liquor to a density of 38° to 41° Baumé; subjecting the reconverted liquor to a slow motion crystallizing operation, in a crystallizer having a water jacket; circulating water through the jacket beginning twelve hours after the loading of the crystallizer, bringing down the temperature of the massecuite to about 69° F., completing the crystallization within from seven to ten days; and purging the massecuite of its mother liquor.

CHARLES J. COPLAND.